United States Patent [19]
Kawakami

[11] Patent Number: 6,012,353
[45] Date of Patent: Jan. 11, 2000

[54] GEAR POSITION SENSING UNIT

[75] Inventor: Tatsuya Kawakami, Sakai, Japan

[73] Assignee: Shimano, Inc., Osaka, Japan

[21] Appl. No.: 09/023,240

[22] Filed: Feb. 13, 1998

[51] Int. Cl.[7] ............................ F16C 1/10; B60K 20/00; G05G 11/00

[52] U.S. Cl. ..................... 74/502.2; 74/473.13; 74/488; 74/473.28; 224/36

[58] Field of Search .................................. 74/502.2, 488, 74/489, 473.13, 473.14, 473.28; 340/432; 403/354; 224/36; 341/16

[56] References Cited

U.S. PATENT DOCUMENTS

| | | | |
|---|---|---|---|
| 3,206,740 | 9/1965 | Maclay | 341/16 |
| 4,570,835 | 2/1986 | Criqui et al. | 224/36 |
| 5,582,489 | 12/1996 | Marzio et al. | 403/354 |
| 5,625,336 | 4/1997 | Yamamoto | 340/432 |
| 5,701,786 | 12/1997 | Kawakami | 74/502.2 |

OTHER PUBLICATIONS

U.S. Patent Application No. 08/991,260; "Electrical Operating Device for Bicycles;" filed Dec. 12, 1997.

*Primary Examiner*—Tamara L. Graysay
*Assistant Examiner*—Colby Hansen
*Attorney, Agent, or Firm*—James A. Deland

[57] ABSTRACT

An external gear position sensing unit for attachment to a shift control device includes a sensor housing, a first electrical contact member supported to the sensor housing, a support member rotatably supported to the sensor housing, a second electrical contact member coupled to the support member for movement therewith and for contacting the first electrical contact member, and a coupling member coupled to the support member for movement therewith and exposed to the exterior of the sensor housing. The sensor housing, the support member and the coupling member are coupled together so that the sensor housing, the support member and the coupling member can be attached to the outside surface of the shift control device. If desired, a separate adapter may be coupled to the coupling member and exposed to the exterior of the sensor housing for adapting the sensor unit to different shift control devices.

24 Claims, 8 Drawing Sheets

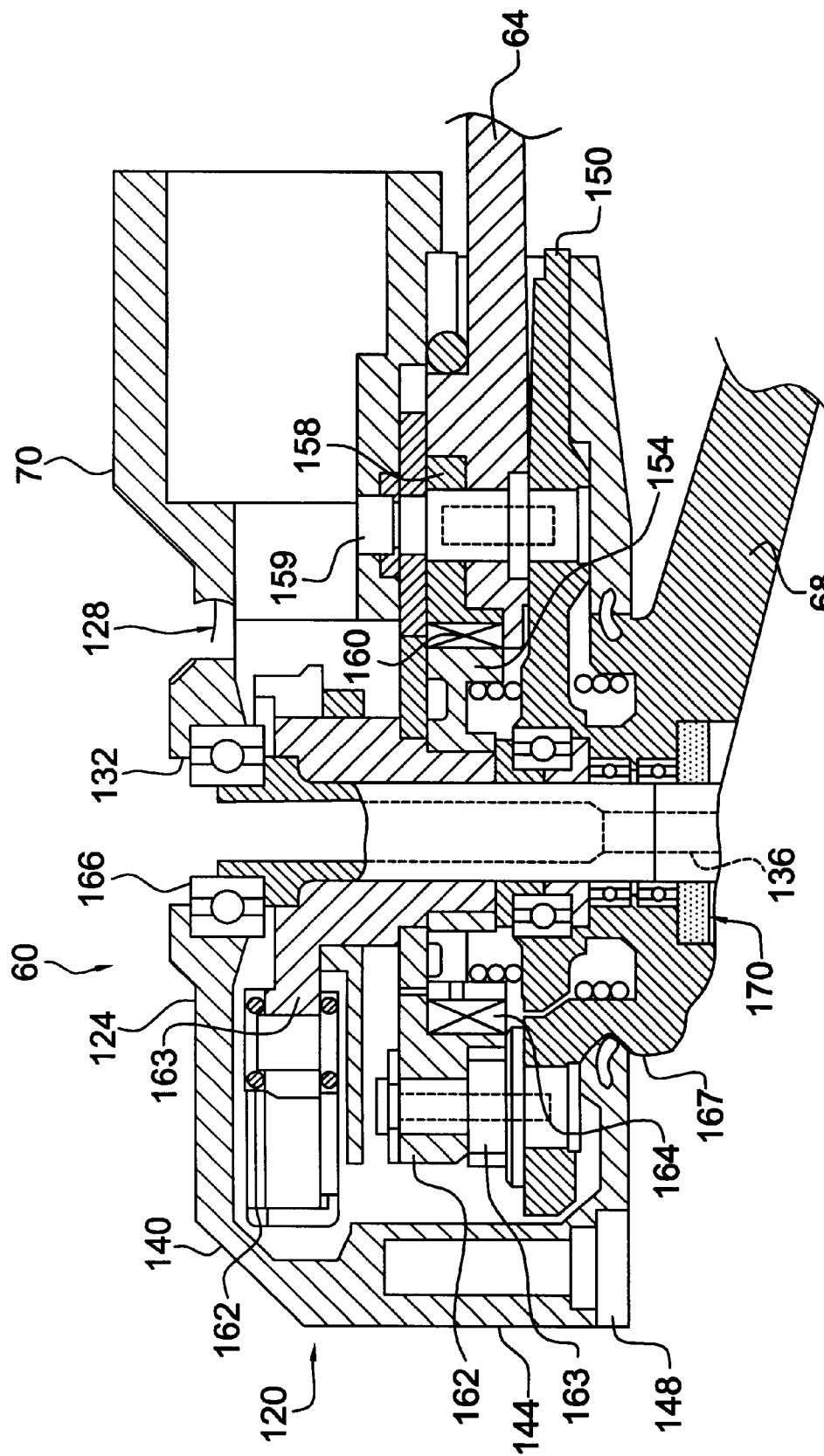

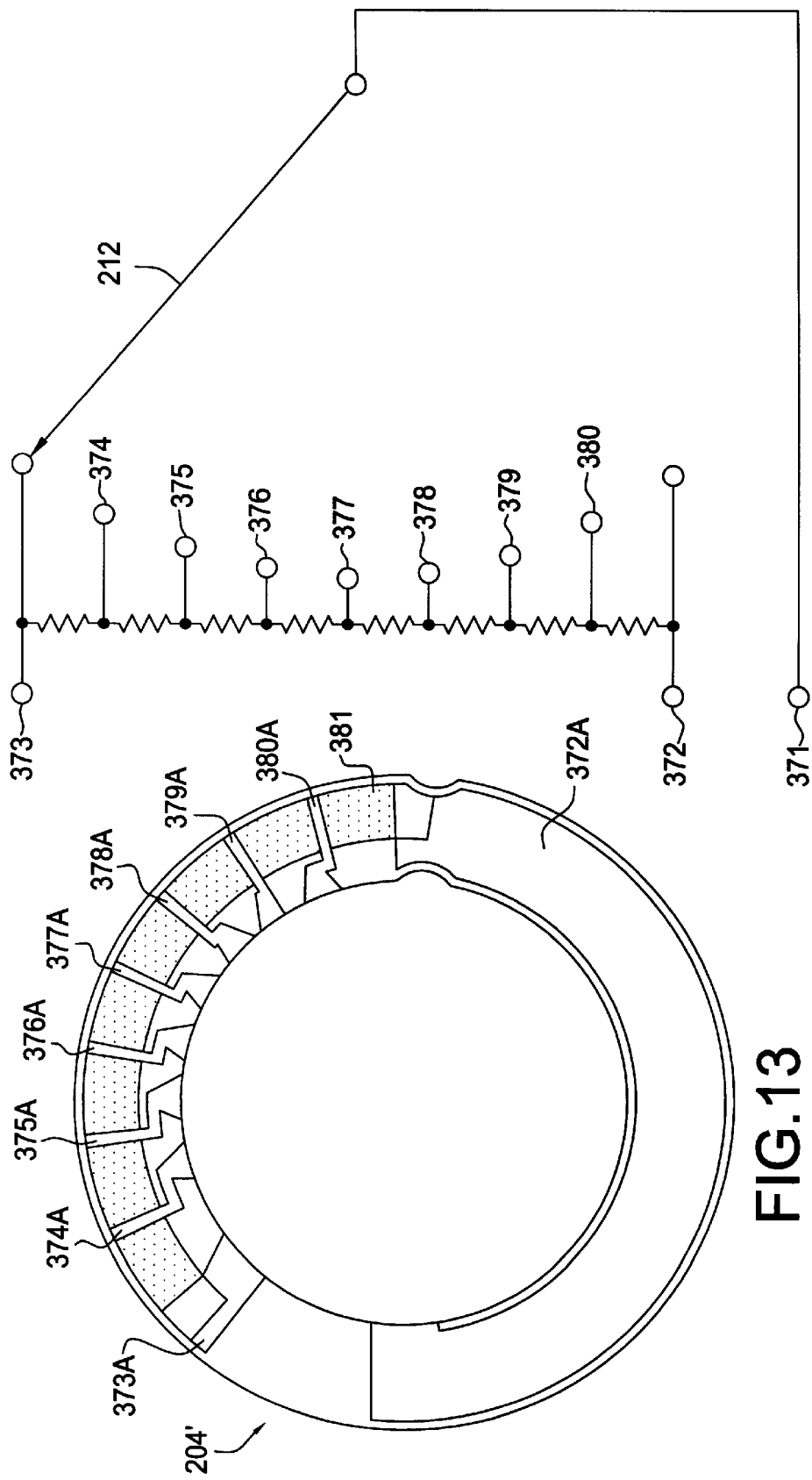

GEAR POSITION SENSING UNIT

BACKGROUND OF THE INVENTION

The present invention is directed to bicycle computers and shift control devices for bicycle transmissions and, more particularly, to a modular and distributed computer assembly that may be added to an existing shift control device and that allows the rider to view the computer display, operate the computer control mechanism and operate the shift control device conveniently.

Bicycles sometimes are equipped with computers that measure and display various riding parameters such as speed, cadence, distance traveled, etc. The operation of the computer and the information displayed is usually controlled by buttons on the computer. Because the rider must carefully view the road in front of the bicycle while riding, it is usually desirable to place the computer in the middle of the bicycle handlebar to minimize distraction when viewing the computer display. However, if the rider needs to change the operation of the computer or the information on the computer display, the rider must remove his or her hand from the bicycle's brake and/or shift operating device to operate the control buttons on the computer. That is usually undesirable during a race where such hand removal can slow the rider considerably.

The disadvantage of removing the rider's hand from the brake and/or shift operating device can be minimized by placing the computer next to the brake and/or shift operating device. However, then the computer display is located far from the center of the bicycle, thus requiring the rider to look to the left or right in order to check the computer display. High performance riders find such a distraction unacceptable.

Some bicycle computers have the ability to control a bicycle shifting device such as a motor controlled derailleur or hub transmission or at least display the sprocket or gear ratio currently selected by the shift control device. Such computers usually have sensors installed to the shift control device for detecting the position of the shift control device, and the position of the shift control device is used to calculate the currently selected sprocket or gear ratio. As a result, the computer and shift control device are usually constructed and sold as a unit. Of course, some riders may not want or need a bicycle computer, so a different shift control device must be constructed without a computer, even if the remaining parts of the shift control device are identical to the shift control device sold as a unit with the computer. This increases manufacturing and inventory costs. Also, if a rider who buys a shift control device without a computer later decides to add a computer to the bicycle, then the rider must buy the shift control device sold as a unit with the computer because there is no way to install the sensors to the originally purchased shift control device. Thus, there is no flexibility to upgrade.

SUMMARY OF THE INVENTION

The present invention is directed to a modular and distributed computer assembly that may be added to an existing shift control device. A device constructed according to the present invention allows the rider to view the computer display, operate the computer control mechanism and operate the shift control device very conveniently. The shift control device can be purchased initially, and the computer may be added to the shift control device at a later date.

In one embodiment of the present invention, an external gear position sensing unit for attachment to a shift control device includes a sensor housing, a first electrical contact member supported to the sensor housing, a support member rotatably supported to the sensor housing, a second electrical contact member coupled to the support member for movement therewith and for contacting the first electrical contact member, and a coupling member coupled to the support member for movement therewith and exposed to the exterior of the sensor housing. The sensor housing, the support member and the coupling member are coupled together so that the sensor housing, the support member and the coupling member can be attached to the outside surface of the shift control device. If desired, a separate adapter may be coupled to the coupling member and exposed to the exterior of the sensor housing for adapting the sensor unit to different shift control devices.

When combined with a shift operating device, the combined apparatus includes a shift control device and a gear position sensing unit attached to the shift control device. In this case the shift control device includes a shift control device mounting member for mounting the shift control device to a bicycle handlebar and a cable operating member supported to the shift control device mounting member for pulling and releasing a control cable. The gear position sensing unit includes a sensor housing, a first electrical contact member supported to the sensor housing, a support member rotatably supported to the sensor housing, a second electrical contact member retained to the support member for movement therewith and for contacting the first electrical contact member, a coupling member coupled to the support member and to the cable operating member for rotating the support member in response to movement of the cable operating member, and a fastener for attaching the gear position sensing unit to and detaching the gear position sensing unit from the shift control device. The sensor housing, the support member and the coupling member are coupled together so that the sensor housing, the support member and the coupling member can remain coupled together when the gear position sensing unit is detached from the shift control device.

BRIEF DESCRIPTION OF THE DRAWINGS

FIG. 3 is a view taken along line III—III in FIG. 2;

FIG. 13 is a top view of the fixed electrical contact member that may be used in the rear gear position sensing unit shown in FIG. 4; and FIG. 14 is a schematic diagram of the electrical circuit formed by the rear gear position sensing unit shown in FIG. 4.

DETAILED DESCRIPTION OF THE EMBODIMENTS

Figure 1:
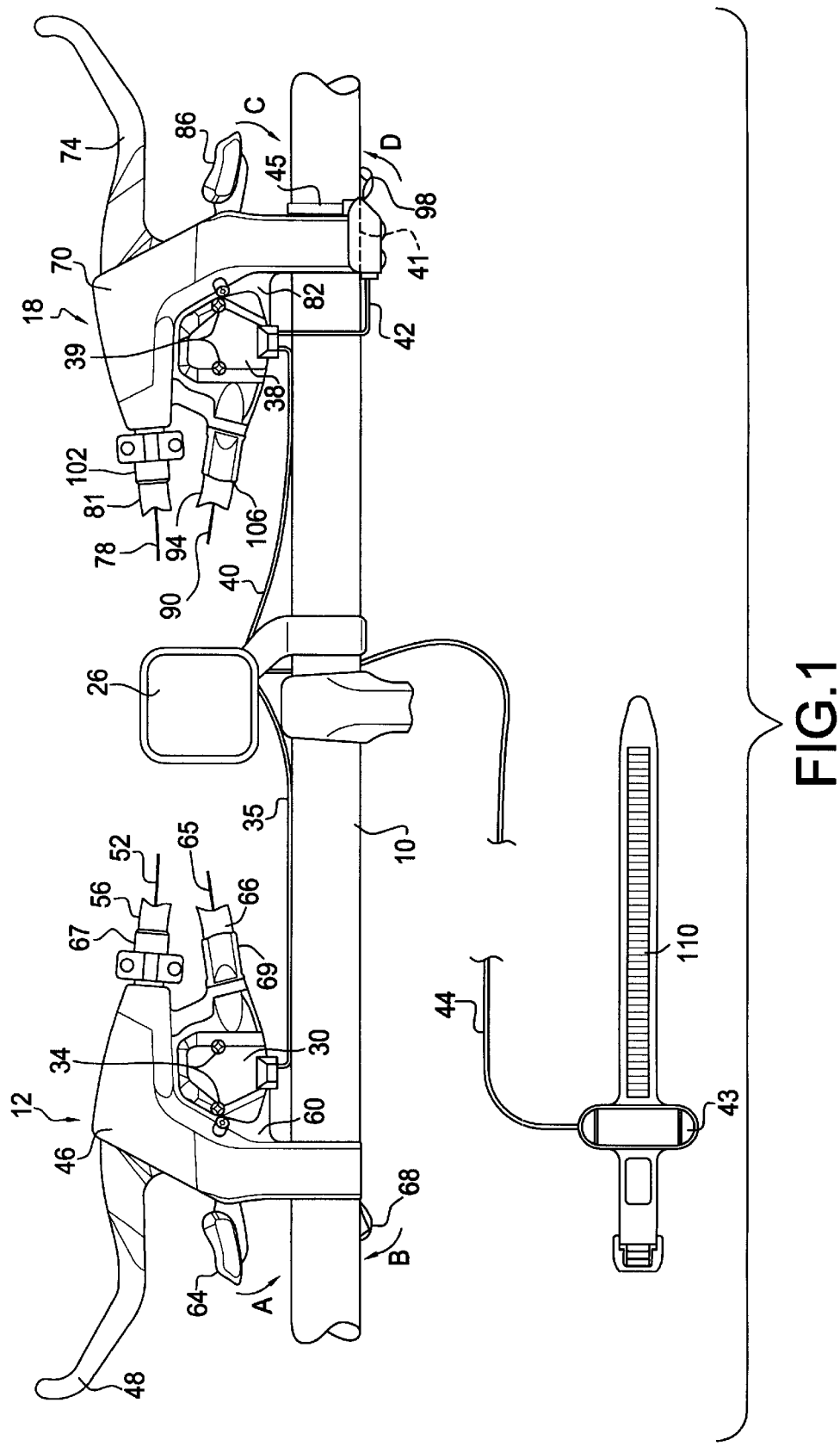
FIG. 1 is a top view of a bicycle handlebar with a particular embodiment of an integrated bicycle computer and shifting device according to the present invention.

FIG. 1 is a top view of a bicycle handlebar 10 with a particular embodiment of an integrated bicycle computer and shifting device according to the present invention. The integrated bicycle computer and shifting device includes a left side or front brake/shift control device 12, a right side or rear brake/shift control device 18, a computer display module 26, a left side or front gear position sensing unit 30 detachably mounted to front brake/shift control device 12 through screws 34 and operatively coupled to display module 26 through an electrical wire 35, a right side or rear gear position sensing unit 38 detachably mounted to rear brake/shift control device 18 through screws 39 and operatively coupled to display module 26 through an electrical wire 40, a switch mechanism 41 mounted to handlebar 10 through a tie strap 45 and operatively coupled to display module 26 through an electrical wire 42 (usually by joining wire 40 in parallel), and a magnetic wheel speed sensor 43 operatively coupled to display module 26 through an electrical wire 44.

Front brake/shift control device 12 includes a mounting bracket 46 for detachably mounting front brake/shift control device 12 to handlebar 10, a brake lever 48 pivotably mounted to mounting bracket 46 for pulling and releasing the inner wire 52 of a brake control cable 56, and a shift control device 60 integrally formed with mounting bracket 46. Shift control device 60 includes a wire releasing lever 64 that rotates in a direction A for releasing an inner wire 65 of a control cable 66 and a wire pulling lever 68 that rotates in a direction B for pulling inner wire 65. When used with a front derailleur that is biased toward the smallest sprocket, wire releasing lever 64 causes the front derailleur to move from a larger sprocket to a smaller sprocket, and wire pulling lever 68 causes the front derailleur to move from a smaller sprocket to a larger sprocket. An adjusting barrel 67 is used to adjust the tension of inner wire 52 in a known manner, and an adjusting barrel 69 is used to adjust the tension of inner wire 65 in a known manner.

Rear brake/shift control device 18 includes a mounting bracket 70 for detachably mounting rear brake/shift control device 18 to handlebar 10, a brake lever 74 pivotably mounted to mounting bracket 70 for pulling and releasing the inner wire 78 of a brake control cable 81, and a shift control device 82 integrally formed with mounting bracket 70. Shift control device 82 includes a wire releasing lever 86 that rotates in a direction C for releasing the inner wire 90 of a control cable 94 and a wire pulling lever 98 that rotates in a direction C for pulling the inner wire 90. When used with a rear derailleur that is biased towards the smallest sprocket, wire releasing lever 86 causes the rear derailleur to move from a larger sprocket to a smaller sprocket, and wire pulling lever 98 causes the rear derailleur to move from a smaller sprocket to a larger sprocket. An adjusting barrel 102 is used to adjust the tension of inner wire 78 in a known manner, and an adjusting barrel 106 is used to adjust the tension of inner wire 90 in a known manner.

Front gear position sensing unit 30 detects the operating position of front shift control device 60 and communicates signals indicating the detected operating position to display module 26 through wire 35. Similarly, rear gear position sensing unit 38 detects the operating position of rear shift control device 82 and communicates signals indicating the detected operating position to display module 26 through wire 40. Magnetic wheel speed sensor 43 is bonded to or formed as one piece with a tie strap 110. Wheel speed sensor 46 operates in a conventional manner by detecting the passage of a magnet (not shown) attached to the bicycle wheel (not shown) and by providing electrical pulses to display module 26 through wire 44. Display module 26 includes a processing circuit which inputs the signals from front gear position sensing unit 30, rear gear position sensing unit 38, switch mechanism 41 and wheel speed sensor 46 and displays various riding parameters such as speed, distance traveled, etc. in accordance with commands from switch mechanism 41. In this embodiment, display module 26 may include a computer such as that sold by the present assignee under the trademark Flight Deck.

Figure 2:
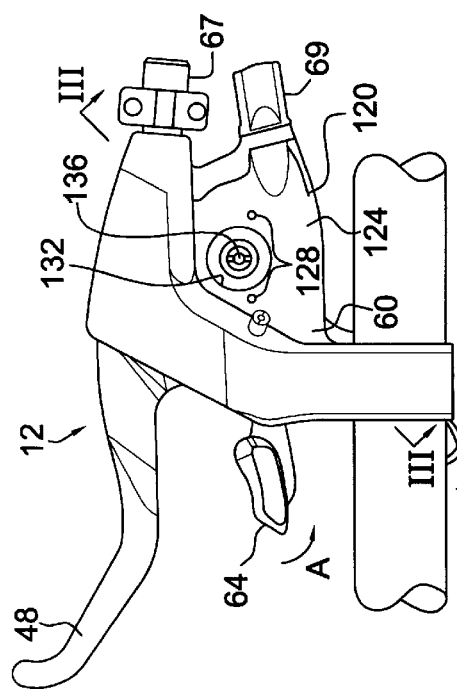
FIG. 2 is a top view of a particular embodiment of a shift control device according to the present invention.

FIG. 2 is a top view of front brake/shift control device 12 with front gear position sensing unit 30 removed. Rear brake/shift control device 18 is constructed the same way except for the number of speeds accommodated. As shown in FIG. 2, front brake/shift control device 12 includes a shift control device mounting member such as a shift control housing 120 with an upper surface 124 having threaded openings 128 for receiving screws 34 and a position communicating opening 132 for exposing a shift lever shaft 136. Shift lever shaft 136 communicates the operating position of shift control device 60 to front gear position sensing unit 30.

FIG. 3 is a view taken along line III—III in FIG. 2. Front shift control device 60 is constructed substantially the same as the shift control device disclosed in application Ser. No. 08/909,772, entitled Brake and Shifting Device filed by the present inventor on Aug. 12, 1997 and incorporated herein by reference. More specifically, shift control housing 120 includes an upper shift control housing member 140 and a lower shift control housing member 144 fastened together through screws 148. Front shift control device 60 further includes a base plate 150, wire releasing lever 64 for releasing inner wire 65, and wire pulling lever 68 for pulling inner wire 65. A ratchet 154 having positioning teeth 160 is mounted on shift lever shaft 136 via rotating body 163 and is coupled to wire releasing lever 64 through a positioning pawl 158 and a pawl shaft 159. Ratchet 154 also includes feed teeth 164 and is coupled to wire pulling lever 68 through a feeding pawl 162 and a pawl shaft 163. Shift lever shaft 136 is attached to ratchet 154 for rotation therewith so that shift lever shaft 136 rotates in response to movement of wire releasing lever 64 and wire pulling lever 68.

As noted above, shift lever shaft 136 is exposed to the outside of housing 120, and a cable hook 162 for attachment to wire 65 is attached to shift lever shaft 136 through rotating body 163 so that wire 65 may be alternately released and pulled in response to operation of wire releasing lever 64 and wire pulling lever 68. The upper end of shift lever shaft 136 is retained to housing 120 through a bearing 166, a middle portion of shift lever shaft 136 is retained to base plate 150 through a bearing 167, and the lower end of shift lever shaft 136 is coupled to wire pulling lever 68 through a shaft nut 170. The operation of front shift control device 60 is known and described in the above-noted copending application. Since the detailed structure and operation of front shift control device 60 is not necessary to a proper understanding of the present invention, further details shall be omitted.

Figure 4:
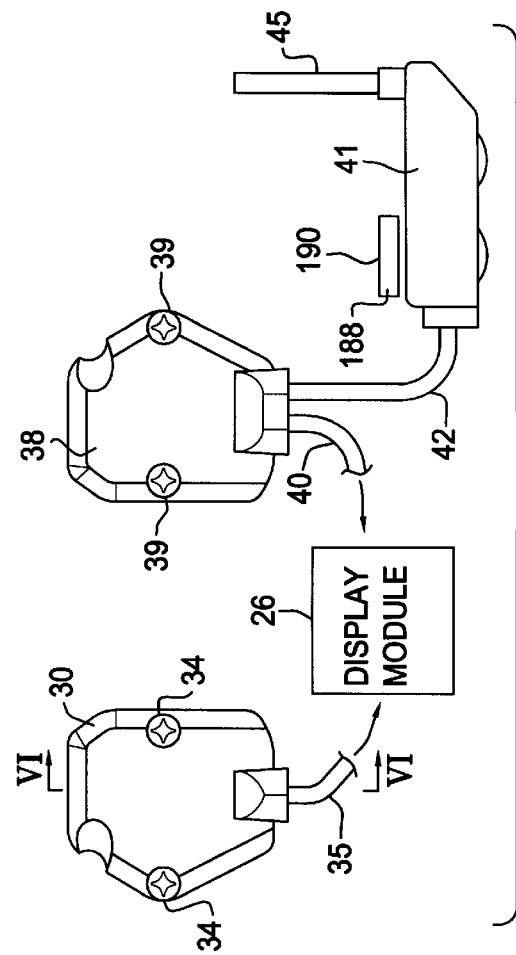
FIG. 4 is a top view of the left gear position sensing unit, the right gear position sensing unit, and the switch mechanism shown in FIG. 1 separated from the shift control devices and the handlebar.
Figure 5:
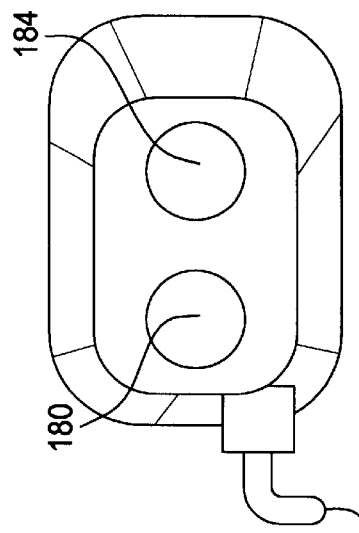
FIG. 5 is a front view of the switch mechanism shown in FIG. 4.

FIG. 4 is a view of the front gear position sensing unit 30, the rear gear position sensing unit 38, and the switch mechanism 41 shown in FIG. 1 separated from the shift control devices 60,82 and handlebar 10, and FIG. 5 is a front view of switch mechanism 41. In this embodiment, switch mechanism 41 includes a start/stop button 180 and a mode button 184 such as that used in the Flight Deck computer sold by the present assignee for communicating commands to display module 26 in a known manner. A support pad 188 having an adhesive tape or surface 190 may be used in lieu of or in addition to tie strap 45 to mount switch mechanism 41 to handlebar 10.

Figure 6:
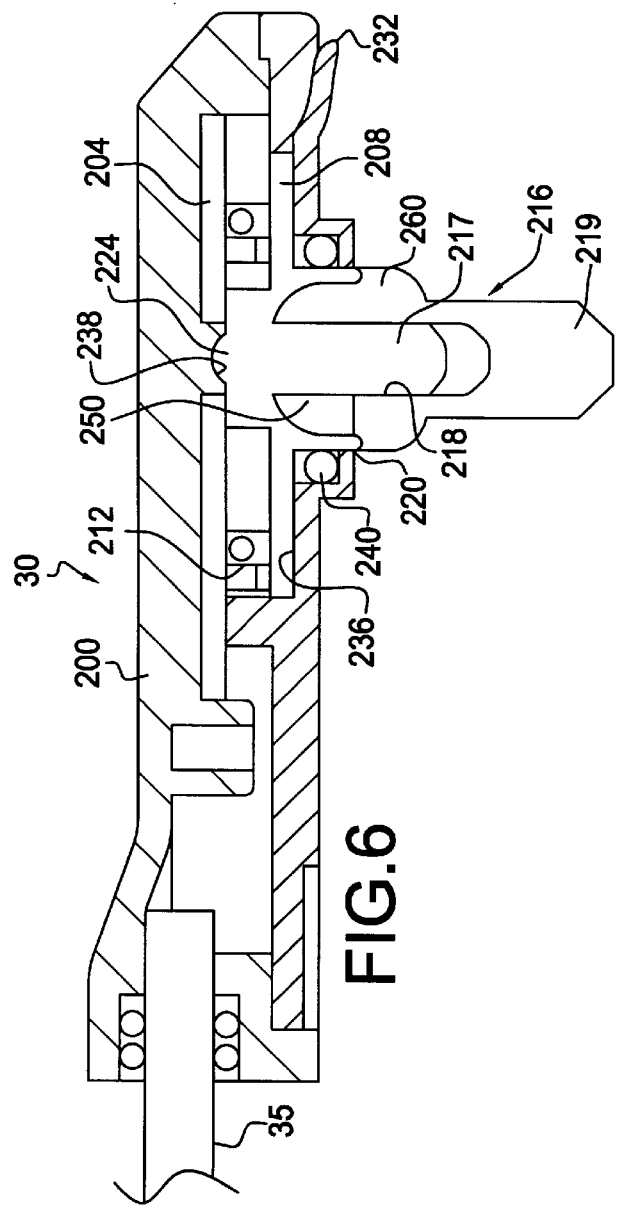
FIG. 6 is a view taken along line VI—VI in FIG. 4.
Figure 7:
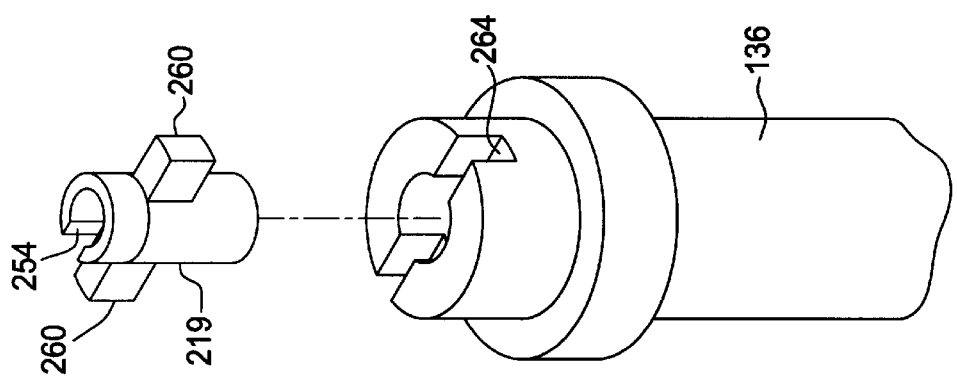
FIG. 7 is a perspective view of an adapter shown in FIG. 6 used to adapt the gear position sensing unit to different shift control devices.

FIG. 6 is a view taken along line VI—VI in FIG. 4 showing the cross sectional structure of front gear position sensing unit 30. Rear gear position sensing unit 38 is constructed the same except for details noted below. As shown in FIG. 6, front gear position sensing unit 30 includes a sensor housing 200, a first electrical contact member 204 supported to sensor housing 200, a support member in the form of a support plate 208 movably (rotatably) supported to sensor housing 200, and a second electrical contact member 212 in the form of an electrical brush coupled to the support plate 208 for movement therewith and for contacting the first electrical contact member 204. A coupling member 216 in the form of a coupling axle 217 which fits within an opening 218 of an adapter 219 is coupled to the support plate 208 for movement therewith. In this embodiment, coupling member 216 is formed as one piece with support plate 208 and is exposed to the exterior of the sensor housing 200 by projecting through an opening 220 in the lower portion of sensor housing 200, although in other embodiments coupling member 216 may be even with or recessed from the lower boundary of opening 220. Coupling member 216 has a convex upper end 224 fitted against a concave bearing 228 formed on the lower inner surface of sensor housing 200, and a lower surface 232 of support plate 208 is supported on an upper inner surface 236 of sensor housing 200 by an O-ring seal 240. Coupling axle 217 has a key 250 that fits within a groove 254 (FIG. 7) formed in adapter 219 to nonrotatably couple coupling axle 217 to adapter 219. As shown in FIG. 7, adapter 219 includes lateral projections 260 that fit within a groove 264 formed in the top of shift lever shaft 136 to nonrotatably couple adapter 219, and hence coupling axle 217 and support plate 208, to shift lever shaft 136 so that rotation of shift lever shaft 136 causes a corresponding rotation of support plate 208.

Figure 8:
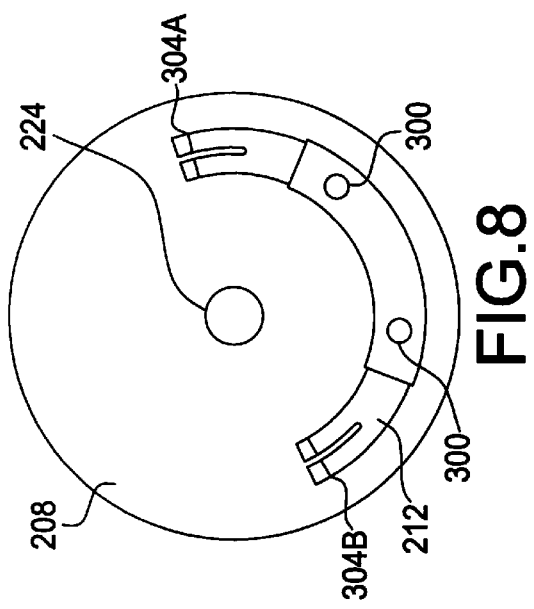
FIG. 8 is a top view of the moving electrical contact member shown in FIG. 6.

FIG. 8 is a top view of the second electrical contact member 212 mounted to support plate 208 shown in FIG. 6. Second electrical contact member 212 may be formed from a phosphor bronze conductor or some other good conductor with adequate spring characteristics, and it is fixed to support plate 208 through attachment holes 300. Contacts 304A and 304B extending upwardly on the two ends of second electrical contact member 212 selectively come into contact with conductive traces formed on first electrical contact member 204.

Figure 9:
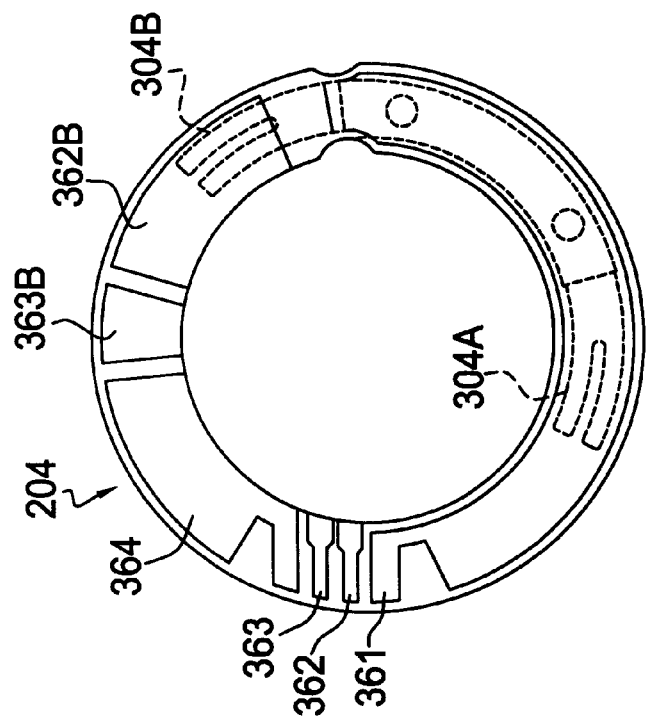
FIG. 9 is a bottom view of the fixed electrical contact member shown in FIG. 6.

FIG. 9 is a diagram depicting the lower side of first electrical contact member 204 showing the pattern of conductive traces or electrical contacts for the front gear position sensing unit 30. The lower side, which is the side in contact with the second electrical contact member 212, is provided with a plurality of electric contacts 361, 362, 362b, 363, 363b, and 364. Electric contacts 361, 362 and 363 form the contact terminals for wire 35. Thus, in this embodiment wire 35 requires at least four signal lines. The second electrical contact member 212 indicated by a broken line selectively couples the signal appearing at electrical contacts 362b, 363b and 364 to electrical contact 361, and this information is used to determine the shift position of front shift control device 60.

Figure 10:
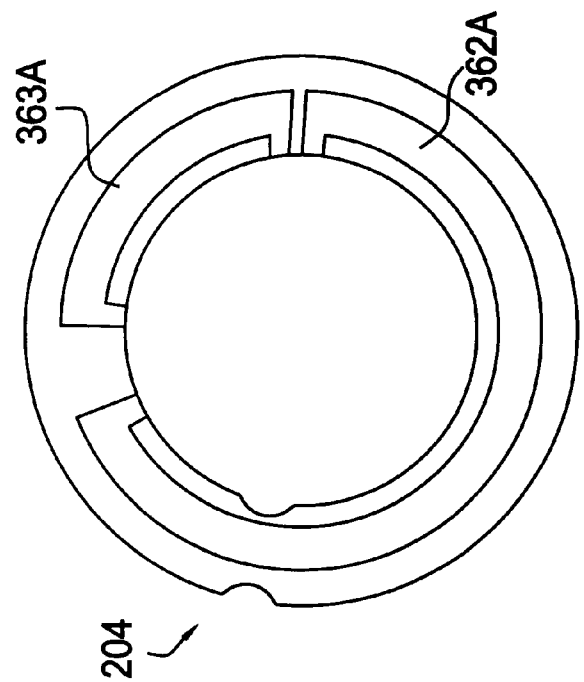
FIG. 10 is a top view of the fixed electrical contact member shown in FIG. 6.

FIG. 10 is a diagram depicting the upper side of first electrical contact member 204. The upper side is provided with a connecting pattern 362a for electrically connecting the electric contacts 362b and 362 on the lower side, and with a connecting pattern 363a for electrically connecting the electric contacts 363b and 363 on the lower side. The electric contacts on the lower side and the connecting patterns on the upper side may be electrically connected via through holes.

Figure 11:
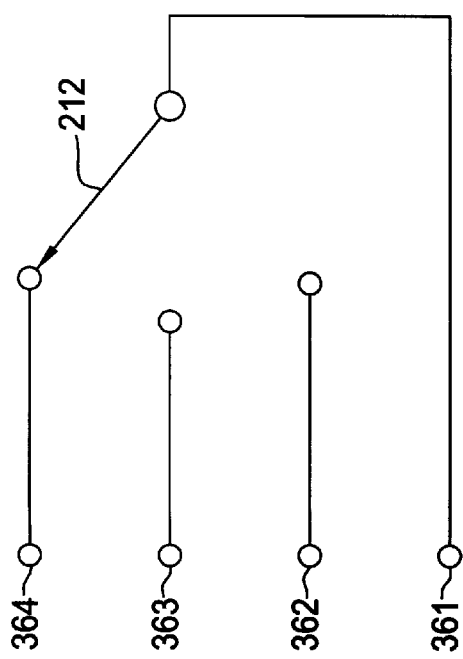
FIG. 11 is a schematic diagram of the electrical circuit formed by the gear position sensing unit shown in FIG. 6.

FIG. 11 is a diagram depicting the equivalent electric circuit of the front gear position sensing unit 30. The interconnection state of the electric contact 361 and the electric contacts 362 through 364 is switched depending on the rotational position of the second electrical contact member 212. Thus, the shift position of the front shift control device can be identified depending on which of the electric contacts 362 through 364 is connected to the electric contact 361. The shift position can be detected by such a circuit because the front shift control device has relatively few shift stages. In this case, there are three shift stages.

Figure 12:
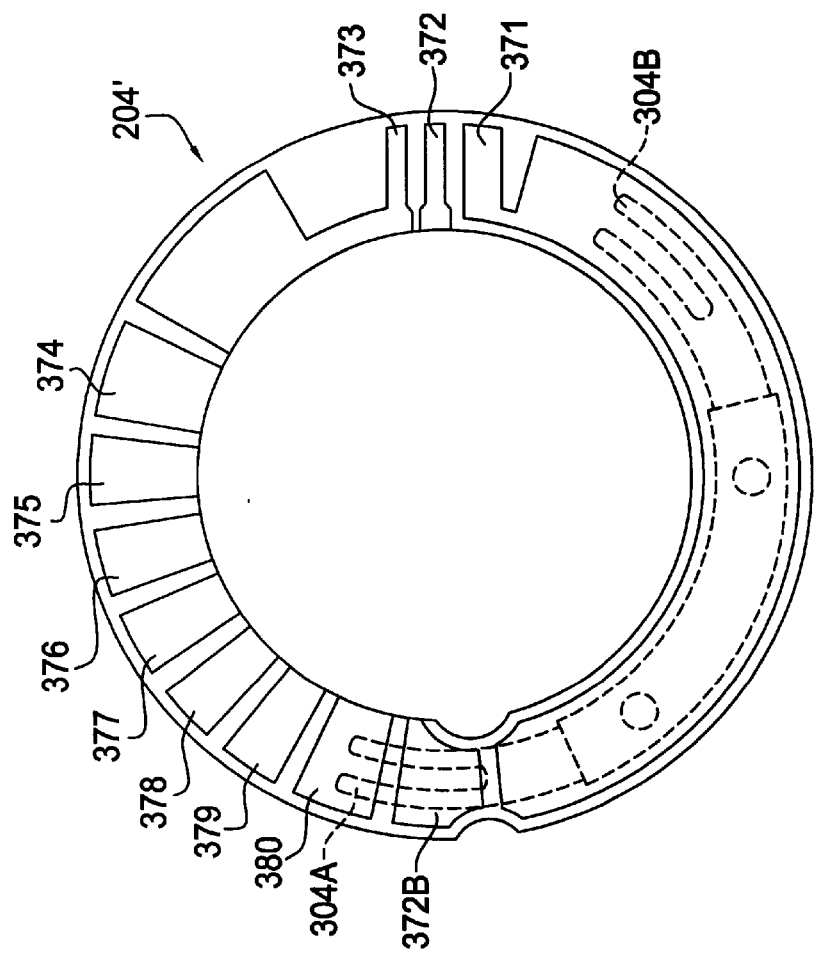
FIG. 12 is a bottom view of a fixed electrical contact member that may be used in the rear gear position sensing unit shown in FIG. 4.

Rear gear position sensing unit 38 has the same structure as front gear position sensing unit 30 except for the structure of first electrical contact member 204 and the number of signal lines required for wire 40. FIG. 12 is a diagram depicting the contact pattern on the lower side of a first electrical contact member 204' for the rear gear position sensing unit 38. The lower side, which is the side in contact with the second electrical contact member 212, is provided with a plurality of electric contacts 371, 372, 372b, and 373 through 380. Electric contacts 371, 372 and 373 form contact terminals for wire 40 as shown on the right side of FIG. 12. Thus, wire 40 requires at least three signal lines. Second electrical contact member 212, indicated by a broken line, selectively connects the signal appearing at one of the electric contacts 372B–380 to contact terminal 371 depending upon the rotational position of second electrical contact member 212.

FIG. 13 is a diagram depicting the contact pattern on the upper side of first electrical contact member 204' for rear gear position sensing unit 38. The upper side of first electrical contact member 204' is provided with a connecting pattern 372a for electrically connecting the electric contacts 372b and 372 on the lower side, a resistor film 381, and resistor terminals 373a through 380a. The two ends of the resistor film 381 are connected to the resistor terminal 373a and the connecting pattern 372a, respectively, and resistor terminals 374a through 380a are connected in equidistant locations in the midportion of the resistor film 381. The resistor terminals 373a through 380a on the upper side are electrically connected to the respective electric contacts 373 through 380 on the lower side. In this embodiment, the electric contacts on the lower side and the resistor terminals and connecting patterns on the upper side are electrically connected via through holes.

FIG. 14 is a diagram depicting the equivalent electric circuit of the rear gear position sensing unit 38. The interconnection state of the electric contact 371 and the electric contacts 372 through 380 is switched depending on the rotational position of second electrical contact member 212. The shift position of the rear shift control device can be identified because the resistance between the electric contacts 371 and 372 or between the electric contacts 371 and 373 varies in steps depending on which of the electric contacts 372 through 380 is connected to the electric contact 371. That is, the rear gear position sensing unit 38 functions as a potentiometer that allows resistance to vary in steps. For example, a prescribed voltage may be applied between the electric contacts 372 and 373, thus making it possible to identify the shift position on the basis of this detected voltage. An A/D converter should be used for converting the detected voltage to a digital value indicating the shift position. It is preferable for the shift position to be detected using such a circuit because the rear shift control device has relatively many shift stages. In this case, there are nine shift stages.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. Although conductive wires were shown for communicating signals between the various components, wireless radio transmitters may be used as well as optical fibers. Thus, the scope of the invention should not be limited by the specific structures disclosed. Instead, the true scope of the invention should be determined by the following claims.

What is claimed is:

1. An external gear postition sensing unit for attachment to a shift control device comprising:
   a sensor housing;
   a first electrical contact member supported to the sensor housing;
   a support member rotatably supported to the sensor housing;
   a second electrical contact member coupled to the support member for movement therewith and for contacting the first electrical contact member;
   wherein the first electrical contact member, the support member and the second electrical contact member are supported wtihin the sensor housing so that the first electrical contact member, the support member, the second electrical contact member and the sensor housing are retained together as a modular unit;
   a coupling member coupled to the support member for movement therewith and exposed to the exterior of the sensor housing; and
   wherein the sensor housing, the support member and the coupling member can be attached to teh outside surface of the shift control device.

2. The gear position sensing unit according to claim 1 further comprising a fastener for attaching the gear position sensing unit to and detaching the gear position sensing unit from the shift control device.

3. The gear position sensing unit according to claim 1 wherein the coupling member extends outside the sensor housing.

4. The gear position sensing unit according to claim 3 wherein the coupling member comprises an axle.

5. The gear position sensing unit according to claim 4 wherein the axle is formed as one piece with the support member.

6. The gear position sensing unit according to claim 1 further comprising a switch housing having a switching member, wherein the switch housing is coupled to the sensor housing.

7. The gear position sensing unit according to claim 6 wherein the switch housing is integrally formed with the sensor housing.

8. The gear position sensing unit according to claim 7 wherein the switch housing is formed as one piece with the sensor housing.

9. The gear position sensing unit according to claim 6 wherein the switch housing is spaced apart from and coupled to the sensor housing through an electrical cable.

10. The gear position sensing unit according to claim 6 further comprising a switch housing mounting member for mounting the switch housing to a handlebar.

11. The gear position sensing unit according to claim 10 wherein the switch housing mounting member comprises a tie strap.

12. The gear position sensing unit according to claim 10 wherein the switch housing mounting member comprises an adhesive tape.

13. The gear position sensing unit according to claim 1 further comprising a separate adapter coupled to the coupling member and exposed to the exterior of the sensor housing.

14. A gear position sensing apparatus comprising:
   a shift control device including:
      a shift control device mounting member for mounting the shift control device to a bycycle handlebar; and
      a cable operating member supported to the shift control device mounting member for pulling and releasing a control cable;
   a gear position sensing unit including:
      a sensor housing;
      a first electrical contact member supported to the sensor housing;
      a second electrical contact member retained to the support member for movement therewith and for contacting the first electrical contact member;
      whrein the first electrical contact member, the support member and the second electrical contact member are supported within the sensor housing;
      a coupling member coupled to the support member and to the cable operating member for rotating the support member in response to movement of the cable operating member;
      wherein the coupling member is exposed to an exterior of the housing;
      a fastener for attaching the gear position sensing unit to and detaching the gear position sensing unit from the shift control device; and
      wherein the sensor housing, the support member and the coupling member are coupled together so that the sensor housing, the support member and the coupling member can remain coupled together when the gear position sensing unit is detached from the shift control device.

15. The apparatus according to claim 14 wherein the coupling member comprises an axle.

16. The apparatus according to claim 15 wherein the axle is formed as one piece with the support member.

17. The apparatus according to claim 14 further comprising a switch housing having a switching member, wherein the switch housing is coupled to the sensor housing.

18. The apparatus according to claim 17 wherein the switch housing is integrally formed with the sensor housing.

19. The apparatus according to claim 18 wherein the switch housing is formed as one piece with the sensor housing.

20. The apparatus according to claim 17 wherein the switch housing is spaced apart from and coupled to the sensor housing through and electrical cable.

21. The apparatus according to claim 17 further comprising a switch housing mounting member for mounting the switch housing to a handlebar.

22. The apparatus according to claim 21 wherein the switch housing mounting member comprises a tie strap.

23. The apparatus according to claim 21 wherein the switch housing mounting member comprises an adhesive tape.

24. The apparatus according to claim 14 further comprising a separate adapter disposed between the coupling member and the cable operating member.

* * * * *